Nov. 2, 1948.  B. A. TETZLAFF  2,452,806
CLAMP
Filed April 14, 1944  2 Sheets-Sheet 1
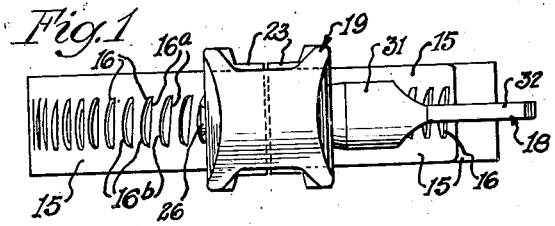
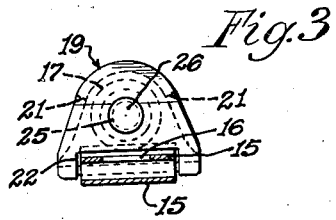
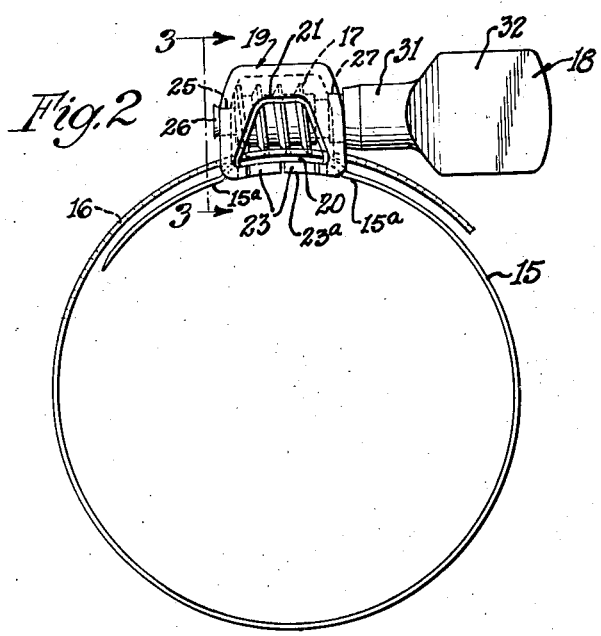
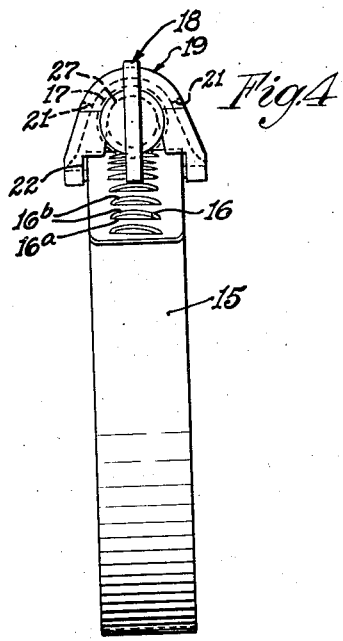
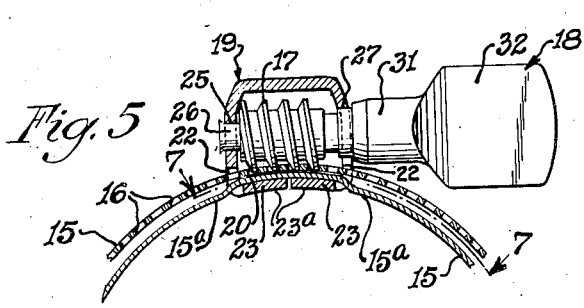
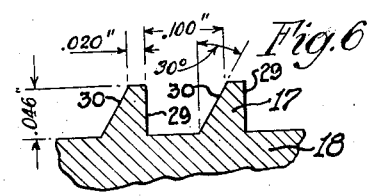
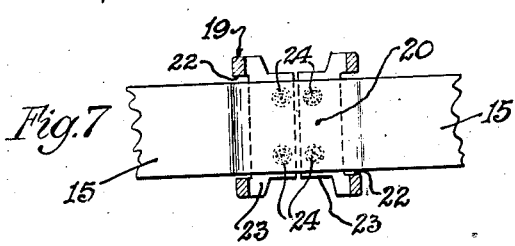
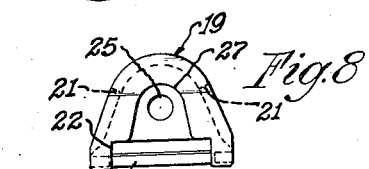
Inventor
Benjamin A. Tetzlaff
by Frank J. Schraeder Jr.
Attorney Nov. 2, 1948. B. A. TETZLAFF 2,452,806
CLAMP
Filed April 14, 1944 2 Sheets-Sheet 2
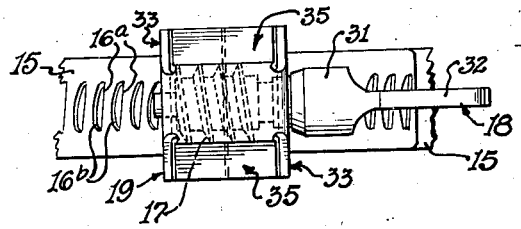
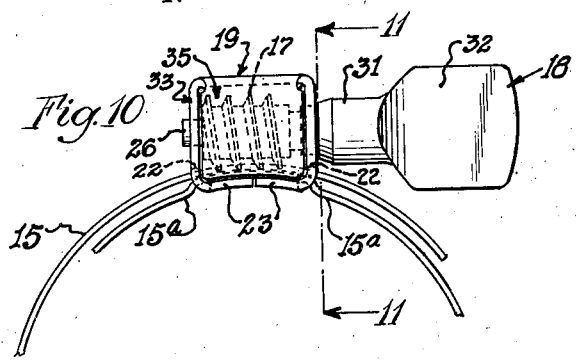
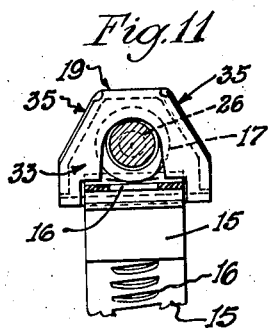
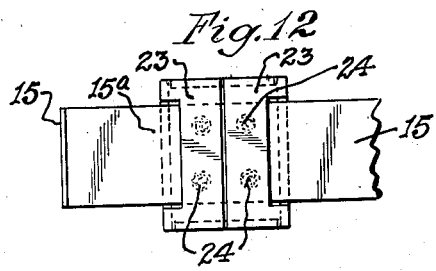
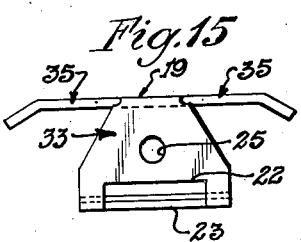
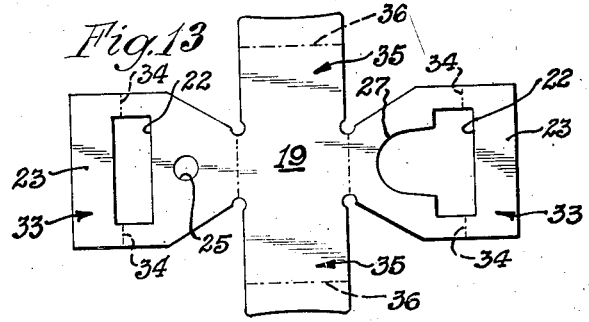
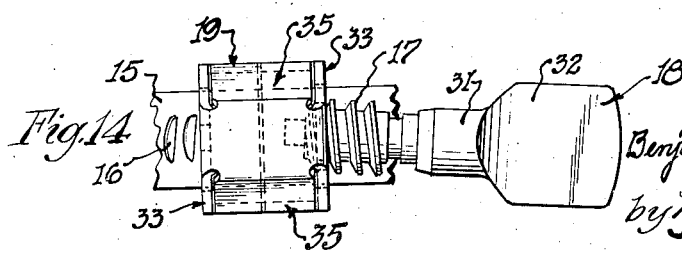
Inventor
Benjamin A. Tetzlaff
by Frank Schraeder Jr.
Attorney.

Patented Nov. 2, 1948

2,452,806

UNITED STATES PATENT OFFICE 2,452,806

CLAMP

Benjamin A. Tetzlaff, Riverside, Ill.; Lillian B. Tetzlaff, Ralph W. Tetzlaff, and Clarence C. Tetzlaff executors of said Benjamin A. Tetzlaff, deceased Application April 14, 1944, Serial No. 531,061

4 Claims. (Cl. 24—19)

This invention relates generally to clamps and has particular reference to an improved clamp adapted for securing a flexible tubular member, such as a hose, to a tubular member such as a pipe.

One of the objects of my invention is to provide a novel hose clamp having a simple, one piece, structurally rigid housing secured to and preferably near one end of a tightening band in such manner that the band together with the housing will more completely circumferentially engage the hose about which it is clamped and which housing together with a band-tightening screw will rigidly retain the band in tightened position about the hose.

Another object of my invention is to provide a novel adjustable hose clamp consisting of only three coacting elements.

A further object is to provide a novel housing for the band-tightening screw and which housing is provided with at least one side opening to permit introduction therein of one of the electrodes of spot welding apparatus whereby the housing may readily be spot welded to the clamp band.

Still another object of my invention is found in a die-stamped housing providing a pair of side openings therein for one of the welding electrodes whereby said housing may be spot welded to the clamp band and thereafter portions of said housing may be bent to close said openings and thereby stiffen the housing structure.

With the above and other objects in view, my invention consists in the novel combination, construction and arrangement of the parts shown in preferred embodiments in the attached drawings, described in the following specifications, and particularly pointed out in the appended claims.

In Figs. 1 to 8 inclusive, I illustrate one embodiment of my invention employing a drawn or cast metal housing while in Figs. 9 to 15 inclusive, I illustrate another embodiment thereof wherein the housing consists of a die-stamping.

Referring now to the drawings:

Fig. 1 shows a plan view of my improved hose clamp;

Fig. 2 shows a side elevation of the same;

Fig. 3 is an end elevation of the tightening screw housing taken along the line 3—3 on Fig. 2 looking in the direction of the arrows;

Fig. 4 is an end elevation of my improved hose clamp with a view of the tightening screw housing from an opposite direction to that shown in Fig. 3;

Fig. 5 is a fragmentary cross-section of my novel clamp, tightening screw and housing therefor;

Fig. 6 is a fragmentary detail section of the tightening screw thread;

Fig. 7 is a horizontal section of the housing taken along the line 7—7 of Fig. 5 looking in the direction of the arrows;

Fig. 8 is an end elevation of the housing with the tightening screw removed therefrom;

Fig. 9 is a fragmentary plan view of a modified form of my improved hose clamp in which the tightening screw housing is formed from a metal stamping;

Fig. 10 is a side elevation of the screw housing shown in Fig. 9;

Fig. 11 is a sectional end view taken along the line 11—11 of Fig. 10 looking in the direction of the arrows;

Fig. 12 is a bottom plan view showing the manner of attaching the stamped housing of my novel clamp to the tightening band;

Fig. 13 is a plan view of the stamped housing before it is shaped;

Fig. 14 is a plan view of my novel screw housing with the tightening screw about to be inserted therein; and Fig. 15 shows an end view of the partially formed housing.

In the drawings like reference characters designate like or similar parts throughout.

Referring to the drawings, the reference numeral 15 designates a flexible metal band having a plurality of openings or perforations 16 spaced longitudinally in one end of the band 15 and cut therein at such an angle as to cooperate with the thread 17 of the band-tightening thumb screw designated generally by the reference numeral 18 and rotatably mounted within the housing which is designated generally by reference numeral 19. The spaced openings or threads 16 extend from one end of the clamp band 15 a sufficient distance longitudinally of the band so that the band may be employed to clamp hose varying slightly in relative diameters although I prefer to construct each screw housing for a predetermined hose diameter.

The band 15 is crimped to form a slightly offset seat portion 20 which is slightly arcuate to conform to the slightly arcuate base portions 23 and to which housing portions 23 the offset portion 20 of the band is secured as preferably by spot welding 24.

The purposes of offsetting the portion 20 is to permit the inner faces 15ª of the band portions which are adjacent to the offset portion 20, at the opposite ends of the housing 19, to lie substantially in the same arcuate plane of the bottom faces 23a of the housing base portions 23 to thereby provide a more complete or, for all practical purposes, substantially continuous circumferential engagement of the band 15 and housing 19 about a hose connection.

The unitary housing 19 is preferably made of drawn or cast metal and is formed with two similarly shaped oppositely disposed side wall openings 21 and also with two slot-like end wall openings 22 of sufficient width to receive overlapped portions of the clamp band 15. The side wall openings 21 are of trapezoidal shape to strengthen the housing and serve to permit introduction therein of one of the electrodes of a spot welding machine by which, at the points 24, the offset seat portion 20 in the crimped section of the band 15 is spot welded to the oppositely disposed adjacent bottom portions 23 of the housing 19. The housing 19 is provided in one end wall thereof with an opening 25 which constitutes a bearing for the reduced end 26 of the band-tightening screw 18 while the opposite end wall of the housing has an opening therein which is substantially semi-circular-shaped at the top thereof as at 27 and progressively enlarged downwardly into mergence with the transverse slot 22 and being of sufficient size so that the band-tightening screw 18 may readily be threaded therethrough, it being understood that the thickness of the walls of the housing 19 is such that this may be accomplished.

It will be noted with particular reference to Fig. 6 that when the clamp band is tightened the leading face 29 of the band-tightening screw thread 17 is perpendicular to the turning axis of the tightening screw 18 and that the follower or trailing face 30 is formed relatively angularly to the leading face 29. This facilitates the force imparting engagement of the screw threads 17 with the particularly shaped perforations 16 in the band 15. The perpendicular face 29 of the screw thread insures an interlocking engagement of the screw 18 with the band 15 in any given position of the screw 18. The band-tightening screw 18 is provided with an enlarged shank portion 31 which abuts with one end of the housing 19 and provides another bearing for the screw. The outer end of the screw 18 is flattened, as at 32, to form a convenient operating handle. The smaller opposite end of the screw which is supported in the housing bearing portion 25 may be peened if desired to prevent its withdrawal.

In operation, the band 15 is placed about the hose and the perforated end thereof is fed through the slot 22 into the housing until the screw thread 17 is engaged. The thumb screw 18 is then rotated causing the perforated end of the band 15 to move through the housing by the driving action of the thread 17 until the required degree of tightness is secured. The particular shape of the thread 17 facilitates the feeding of the band 15 through the housing and also brings about the locking of the same in position when the turning of the screw 18 ceases. The seat 20 near one end of the band 15 furnishes a support to which the housing base portions 23 are spot welded with the result that the inner surfaces 23a thereof are in substantially the same arcuate plane as the inner surfaces 15a of the band 15 and this prevents any malformation of the hose. The clamp band 15 together with the housing 19 forms a substantially complete circumferential surface for engagement with the hose.

It will be noted that each of the perforations 16 is defined by a straight line edge 16a and an arcuate edge 16b. The straight edge 16a is engaged by the vertical or perpendicular face 29 of the screw thread 17 while the arcuate edge 16b conforms to and very slightly clears the angular face 30 of the thread 17. Smooth and positive forward and reverse movement of the perforated band end within the housing and a stronger perforated band end are secured by the use of the arcuate edge 16b in each of the perforations 16.

The preferred design of screw thread 17 is illustrated in Fig. 6 and the dimensions shown in Fig. 6 have been found to give satisfactory operation in average sizes of clamps.

The spot welding of the housing 19 to the band 15 not only reduces the cost of the assembly but positively rigidly holds the housing 19 in fixed position on one end of the band.

In the modified form of my invention shown in Figs. 9 to 14 inclusive, the general structure of the housing 19 is similar to that of the housing 19 heretofore described except for the forming thereof.

In this instance the housing 19 consists in its initial form of a metal stamping of generally cross-like shape as shown in Fig. 13. In this form the opposite arms 33 containing the slots 22 are bent down and then the portions 23 are bent along the bend lines 34 inwardly toward each other under the central portion to form the bottom ends of the housing or the housing base portions 23. In such partially completed form, illustrated in Fig. 15, the crimped end portion of the band may then be inserted into the housing, through the openings 22, and spot welded to the portions 23, the oppositely disposed side members 35 remaining in unbent outwardly extended position to permit the insertion of one of the spot welding electrodes into the open sides of the housing and such side members 35 are thereafter bent down to close and complete the housing. This forms a complete enclosure for the screw thread 17, which may be desirable in some instances to protect it from dirt. The side members 35 are bent along the lines 36 appearing in Fig. 13, to give these members the shapes indicated in Fig. 15. In certain instances also the die-stamped housing may be preferable to that of the drawn or cast housing.

Having illustrated and described certain preferred embodiments of my invention, it will be understood that I do not desire to limit myself to the exact details shown in the drawings for it is obvious that various slight modifications and changes may be made therein without departing from the spirit and scope of the appended claims which define my invention.

I claim:

1. In combination, a housing for attachment to a band in a clamp device, having opposed end walls and a non-circular opening in one end wall thereof; a band-tightening unitary member extending through said opening and having a screw-threaded portion in the space within the housing between said end walls and a plain shank portion extending through said opening, the end wall containing said opening being thin enough to permit it to pass between the convolutions of the screw thread during the rotary insertion of the screw-threaded portion of said tightening member through said opening into the housing, 2. A device as set forth in claim 1, wherein the shank of said band-tightening member has an enlargement at its outer end that engages with the outside face of said housing end wall containing the opening through which said member extends.

3. A clamp tightening device for use in a hose clamp of the flexible-band type, said device comprising a screw-supporting housing adapted to be fixed to one end of the band and a screw member rotatably supported on opposite end walls of the housing in position to engage the other end of the band; wherein said screw member has an integral threaded section and a shank section that has a peripheral shoulder spaced apart from the screw threads, and the housing has in one of its walls an opening which at the top portion thereof is substantially semi-circular on a radius less than that of the outside diameter of the threads of the screw and which opening is progressively enlarged from the ends of said semi-circular portion toward the bottom, whereby the screw member may be screwed into the housing through said opening and said shoulder be engaged with the outer side of housing.

4. A tightening device for a hose clamp band comprising a unitary housing having a screw rotatably supported in opposite end wall portions formed with integral base portions which are adapted to be secured to one end portion of said band, said housing having an arcuate top wall portion extending over said screw and formed integrally with said end wall portions and with a pair of relatively angularly disposed side wall portions which latter are provided with trapezoidal side openings aligned transversely to the axis of said screw, each of said side openings being defined by longitudinally spaced side edges converging outwardly toward and meeting an upper or outer longitudinally extending edge of the opening which is substantially parallel to the axis of said screw and disposed below the uppermost portion of the outer face of said arcuate top wall portion, said end wall portions having inwardly relatively oppositely bent portions constituting said base portions and both of said base portions being bent on a common radius whose center is on an axis disposed transversely to the axis of the screw and the inner arcuate faces of said oppositely bent base portions defining the lower or inner edges of said side openings.

BENJAMIN A. TETZLAFF.

REFERENCES CITED

The following references are of record in the file of this patent:

UNITED STATES PATENTS

| Number | Name | Date |
|---|---|---|
| 1,397,508 | Gillet | Nov. 22, 1921 |
| 1,440,270 | Bertherman | Dec. 26, 1922 |
| 1,734,356 | Welch | Nov. 5, 1929 |
| 1,849,948 | Muchler | Mar. 15, 1932 |
| 2,383,920 | Seaholm | Aug. 28, 1945 |
| 2,397,484 | Hedrick | Apr. 2, 1946 |

FOREIGN PATENTS

| Number | Country | Date |
|---|---|---|
| 447,963 | Great Britain | May 28, 1936 |
| 523,313 | Great Britain | July 11, 1940 |